July 26, 1949.   R. M. SHAW   2,477,556
NAVIGATIONAL INSTRUMENT FOR COMPUTING COURSES
Filed Oct. 26, 1945

Inventor
RICHARD M. SHAW

By Thomas S. Maynee
Attorney

Patented July 26, 1949

2,477,556

UNITED STATES PATENT OFFICE 2,477,556

NAVIGATIONAL INSTRUMENT FOR COMPUTING COURSES

Richard M. Shaw, Lakewood, Ohio, assignor of one-half to Thomas S. Mayner, Willoughby Township, Lake County, Ohio Application October 26, 1945, Serial No. 624,666

2 Claims. (Cl. 235—83)

1

This invention relates to navigational instruments, particularly to a device adapted to be used in conjunction with a compass for the determination of errors thereof and the correction of a given course.

The device to be hereinafter described provides a ready and simple means for determining the various navigational readings required to negotiate a given course, and of properly incorporating the compass error to give a corrected course reading. Also, the device obviates all possibilities of error in the application of the determined compass errors to the compass readings inasmuch as the error found is automatically and correctly applied during the mechanical manipulation of the device during the determination.

Furthermore, knowing any three quantities including a course reading, the remaining course readings and the other readings may be readily determined. Thus, having any one course as compass course, magnetic course or true course and any two other readings, the other three readings may readily be determined in a proper relation by means of this device. The device may also be advantageously used on marked ranges to enable the determination of deviation and to plot a deviation curve or table. It also may be used with a gyrocompass to determine variation, or the compass error of a magnetic compass.

The device can be constructed of a variety of materials capable of being printed or etched to be readable. It may be of any size suitable for use. It is self-explanatory, and easily operable. Generally, for ease of manipulation, the device comprises several superposed, concentric disks rotatably secured and marked with the necessary information.

The invention will be more readily understood from the following description and drawing where:

Figure 1:
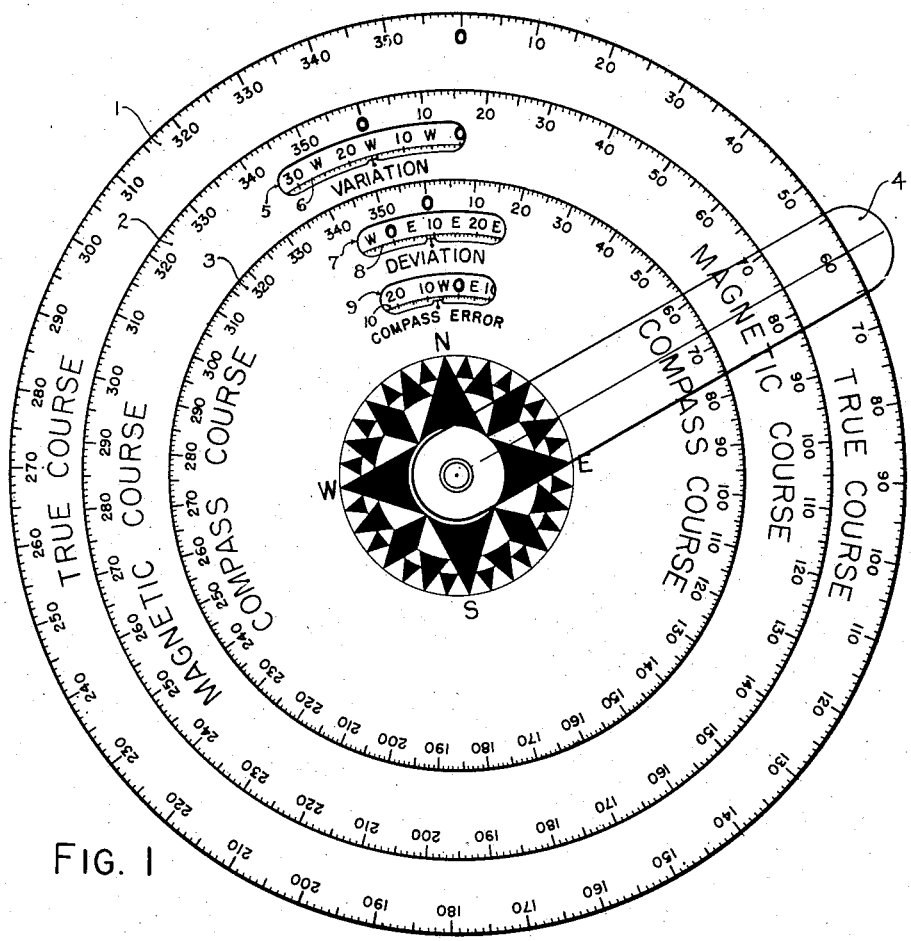
Figure 1 represents a plan view of the device.
Figure 2:
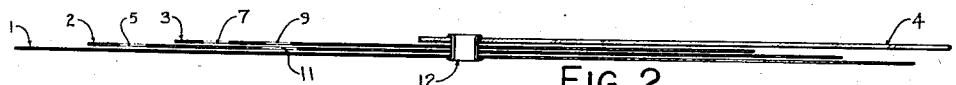
Figure 2 represents a vertical section showing the superposition of the respective disks when all are alined in a zero position.
Figure 3:
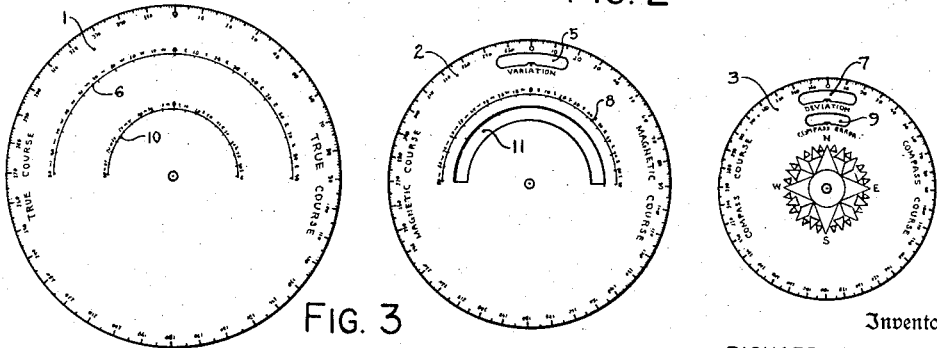
Figure 3 shows, in plan, the respective disks whose combination forms the device of Figure 1.

Referring to the drawing a base disk 1, the largest of the three disks comprising the device, is circumferentially graduated from 0° to 360°. It is also marked "True course." A second disk 2 smaller in diameter than disk 1 is concentrically, rotatably mounted on the base disk 1 and it is similarly graduated from 0° to 360°. A third disk 3 is, further, concentrically and rotatably mounted atop of disk 2 and is also graduated from

2

0° to 360°. An aligning arm 4 for aligning the readings on the three disks is mounted on the third disk 3. All disks and the scale are adapted to be supported and held in position by means of the pin 12 which permits the relative rotation of all the members 1 through 4.

The base disk 1 is further marked with two additional concentric scales 6 and 10. The zero degree (0°) positions of these scales are aligned with the 0° reading of the circumferential scale 0°–360°. The scales are circularly graduated from 0° to 90° W. (west) to the left and from 0° to 90° E. (east) to the right. The uppermost scale 6 is the "variation" scale which refers to the angle between the true meridian and the magnetic meridian, while the lower scale 10 is the "compass error" scale.

Disk 2 is marked "Magnetic course" and the full scale thereon is intended to denote the position of the magnetic pole. The disk further contains an aperture or an arcuate opening 5 adjacent and parallel to its circumference. The lower edge of the opening has midway a slight rise or an extending nipple that is marked so as to facilitate the positioning of the disk relative the scale 6 and the reading thereof. The arcuate aperture or opening 5 is marked "Variation" identifying the scale which it discloses.

Disk 2 has also marked thereon a second scale 8 for denoting "deviation" readings or that angle value that a compass needle is deflected from the magnetic meridian by the magnetism of devices aboard the particular craft. The zero position of the scale 8 is in the same radius as the zero position of the marginal scale of disk 2. Scale 8 is circularly graduated from 0° to 90° W. (west) to the left and 0° to 90° E. (east) to the right. The disk also has a full arcuate opening 11 to entirely expose the compass error scale 10 on disk 1. All of the additional scales may be of any length desired and may comprise full circles rather than as shown.

The third disk 3 has arcuate openings 7 and 9 and into each there extends a nipple to facilitate the position of the disk relative the exposed scales 8 and 10 and their reading. Opening 7 is marked "Deviation" and opening 9 is marked "Compass error"; the titles identify the scales which the apertures disclose. Disk 3 also contains centrally thereof full directional compass markings.

When assembled disk 2 is placed on the base disk 1 and disk 3 is placed on disk 2, all are concentrically aligned. Openings 5 and 11 of disk 2 expose scales 6 and 10, openings 7 and 9 of disk 3 expose scales 8 and also 10. All the scales are apparent and in relation.

A member 4 is provided for aligning the various marginal scale readings. Members 4, as shown, is mounted on top of disk 3 and is held in position by means of the pin 12 which enables it to move relative to the three disk circumferences. The member 4 is desirably made of a transparent material although it could be opaque and constructed to give a radial edge instead of the radial marking line as shown midway the width of the member. The member 4 is preferably longer than the radial distance of disk 1 to permit the manipulator to readily grasp it.

The assembled device is easily operable. For example, having a true course of 60° E. and assuming the variation to be 16° W. and the deviation to be 9° E., it is desired to find the compass course. Initially, all disk circumferential scales are aligned to the 0 position. Disks 2 and 3 are rotated to the left or "westerly" direction to the 16° W. reading on the "Variation" scale. Disk 3 is then rotated to the right or "Easterly" direction to the 9° E. reading on the "Deviation" scale. Further, member 4 is rotated to the 60° E. position of the "True course" scale on disk 1. It will be noted, then, that the compass course to be followed is 67° E. as indicated by the reading on the "Compass course" scale of disk 3. The difference between the compass course and the true course is the compass error which is indicated as 7° W. on the compass error scale. This figure is, of course, checked by the difference between the two scale readings. At the same time the magnetic course is shown to be 76° E.

Generally, for academic purposes or for checking purposes any of the values in the example may be determined providing one of the courses is known and any two other values.

Thus, the present device embodies a method which quickly and algebraically performs steps which would otherwise have to be mentally performed and all errors are obviated since all scales are definitely marked and placed in a proper relation. Also, a check is always provided for the compass error will indicate the difference between the true course and the compass course and in the right direction.

I claim:

1. A device of the character described comprising at least three disk members of different diameters concentrically superposed in step fashion, each of said disk members having similar marginal scale markings from 0° to 360°, two additional scales of different radii on the largest of said disk members, said additional scales having their zeros aligned with that of the marginal scale, an additional scale on said intermediate disk member of a lesser radius than its marginal scale and having its 0 aligned with that of the marginal scale, said intermediate member also having apertures for disclosing the additional scales on the largest disk member, said top mounted disk member having apertures for disclosing one of the additional scales on the bottom member and the additional scale on said intermediate member, compass markings centrally positioned on said top disk member, and a radial member rotatably secured to said disk members for indicating the marginal scale positions.

2. A device of the character described comprising a base disk having an annular scale from 0° to 360° and two additional scales having lesser diameters and being concentric with said annular scale, said additional scales having their zeros aligned with the zeros of the annular scale on the disk and being graduated to said annular scale, the said additional scales marking off east and west degree indicia in opposite directions from the zeros, a second disk of a lesser diameter having an annular scale from 0° to 360° being concentrically pivotally mounted on said base disk and being adapted for relative rotation thereto, said second disk having an additional scale concentric to and similarly graduated as said other scales and also marking off east and west indicia in an opposite direction from its zero and two arcuate apertures for disclosing the additional scales of said base disc, one of said apertures bearing an identifying legend for one of said scales and having an intermediate indicating means, a third disk of a lesser diameter than said other two disks concentrically mounted on said two other disks for relative rotation thereto, said third disk also having an annular scale graduated from 0° to 360° and a compass indicia marked centrally thereof and arcuate apertures for disclosing one of said additional scales on said base disk and the additional scale on said second disk, said apertures bearing scale identifying legends and having intermediate indicating means, a pivotally secured radial indicating member for indicating the graduations of said annular scales of said disks, and means for rotatively securing said disks and said radial indicating member.

RICHARD M. SHAW.

REFERENCES CITED

The following references are of record in the file of this patent:

UNITED STATES PATENTS

| Number | Name | Date |
| --- | --- | --- |
| 1,311,641 | Christenson | July 29, 1919 |
| 1,962,866 | Graham | June 12, 1934 |
| 2,394,226 | Baldocchi | Feb. 5, 1946 |
| 2,410,210 | Levkovitsch | Oct. 29, 1946 |

FOREIGN PATENTS

| Number | Country | Date |
| --- | --- | --- |
| 28,684 | Norway | Mar. 25, 1918 |